United States Patent [19]

Martus

[11] Patent Number: 4,570,691
[45] Date of Patent: Feb. 18, 1986

[54] TIRE PRESSURE REGULATION SYSTEM

[76] Inventor: Donald G. Martus, 38235 Hazel Rd., Mt. Clemens, Mich. 48045

[21] Appl. No.: 606,447

[22] Filed: May 3, 1984

[51] Int. Cl.$^4$ .......................... B60C 5/24; B60C 5/20
[52] U.S. Cl. .................................. 152/332.1; 137/54; 137/223; 137/351; 141/46; 141/302; 152/333.1; 152/418; 152/427; 417/233; 417/294
[58] Field of Search ...................... 152/333.1, 333, 338, 152/331, 415, 418, 427, 428, 332, 332.1, 423–426; 137/223, 351, 54; 417/211, 231, 233, 328, 294, 229; 141/46, 302

[56] References Cited

U.S. PATENT DOCUMENTS

| | | | |
|---|---|---|---|
| 2,554,815 | 5/1951 | Church | 152/342 |
| 2,690,779 | 10/1954 | Rust | 152/331 |
| 2,944,579 | 7/1960 | Kamm et al. | 152/416 |
| 3,236,278 | 2/1966 | Gaillard | 152/10 |
| 4,349,064 | 8/1982 | Booth | 152/418 |

*Primary Examiner*—Edward Kimlin
*Assistant Examiner*—Thomas Bokan
*Attorney, Agent, or Firm*—Peter A. Taucher; John E. McRae; Robert P. Gibson

[57] ABSTRACT

A vehicle wheel-tire assembly wherein the tire has a low inflation pressure (large tire footprint) in a low vehicle speed range, and a large inflation pressure (small tire footprint) in a high vehicle speed range. The tire is partitioned into a series of circumferential compartments, with each compartment being provided with a valve mechanism for introducing air into the compartment and/or withdrawing air from the compartment as needed to maintain desired inflation pressures in the different vehicle speed ranges. The system is contained entirely in the wheel-tire assembly; no external air compressors or control valves are utilized.

6 Claims, 6 Drawing Figures

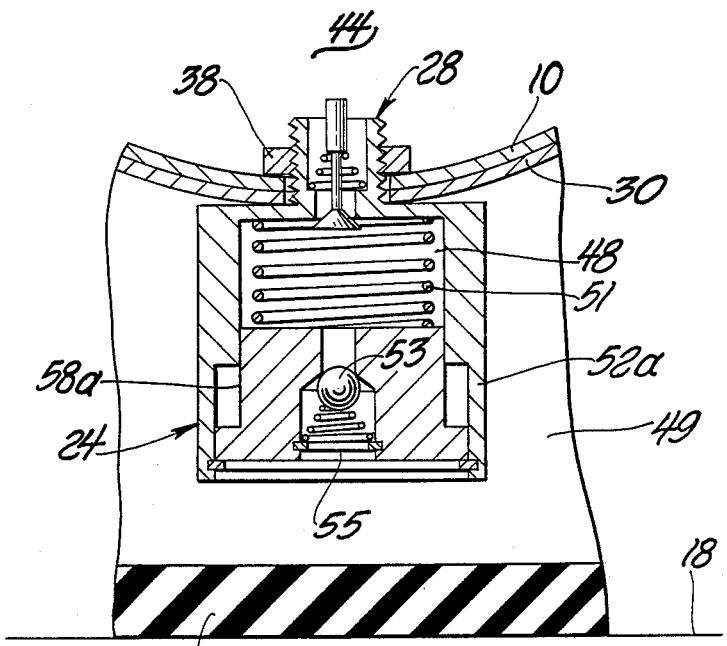
Fig. 4
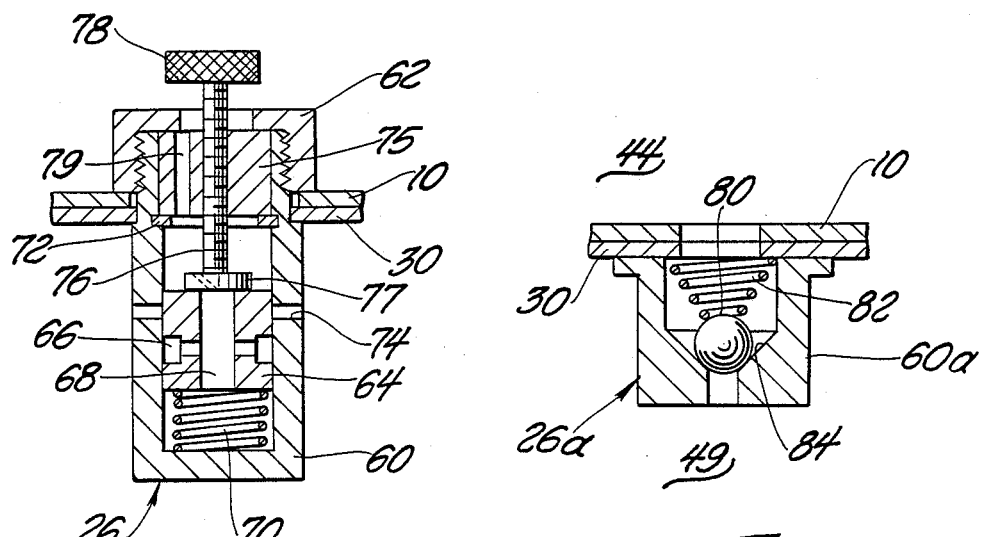
Fig. 5
Fig. 6

TIRE PRESSURE REGULATION SYSTEM

GOVERNMENT INTEREST

The invention described herein may be manufactured, used, and licensed by or for the Government for governmental purposes without payment to me of any royalty thereon.

BACKGROUND AND SUMMARY

This invention relates to a wheel-tire assembly for use on a ground vehicle (e.g. a military truck) operating on soft or hard terrain over a range of vehicle speeds. The wheel-tire assembly is designed so that when the vehicle is moving in a relatively low speed range (e.g. below fifteen miles per hour) the tire is in a partially deflated condition; when the vehicle is operating in a relatively high speed range (e.g. above thirty miles per hour) the tire is fully inflated. In an immediate speed range (e.g. between fifteen miles per hour and thirty miles per hour) the tire can be at progressively higher states of pressurization, i.e. a relatively low pressure at fifteen miles per hour gradually increasing to a relatively high pressure at thirty miles per hour.

The described variable tire pressure provides a relatively large area tire footprint at low vehicle speeds, and a relatively low area tire footprint at the higher vehicle speeds. A large area footprint is advantageous when the vehicle is operating in soft terrain, such as mud, snow or sand; during such periods the vehicle is usually moving at a relatively slow speed so that an increased area footprint is advantageous for traction purposes. When the vehicle is operating on hard dry surfaces at higher rates of speed the small area tire footprint provides decreased rolling resistance and better fuel economy; the higher inflation pressure and smaller tire footprint also tends to improve vehicle stability and controllability at medium and high vehicle speeds.

Under the present invention the desired variation in tire pressure is achieved by a system of valves mounted on the wheel. The wheel is preferably manufactured with a drop center rim to provide a protected cavity for the valves, especially when the tire is undergoing deflection in the partially flattened mode of operation.

The valves are designed so that during certain operational modes the valves cause atmospheric air to be introduced to the tire and exhausted out of the tire as a function of centrifugal force generated by the rotating tire-wheel assembly. At relatively low vehicle speeds a low centrifugal force condition causes reduced (or zero) quantities of air to be admitted to the tire. At intermediate vehicle speeds significant quantities of air are admitted to the tire to achieve higher inflation pressures. At higher vehicle speeds the tire is fully inflated; no air is admitted to the tire or exhausted out of the tire.

One object of the invention is to automatically achieve a relatively large tire footprint at low vehicle speeds and a relatively small tire footprint at high vehicle speeds.

Another object of the invention is to provide a variable tire air pressure, without the requirement for a complex air pressure source and air distribution system, e.g. a central air compressor and valved supply-exhaust lines traversing pneumatic slip rings on the wheels.

THE DRAWINGS

FIG. 4 is a fragmentary sectional view through an additional structure embodying the invention.

FIG. 5 is a sectional view illustrating a lock-out device usable on one of the valves in the FIG. 1 assembly.

FIG. 6 is a fragmentary sectional view of a valve structure that can be used in lieu of an exhaust valve shown in FIG. 1.

Figure 1:
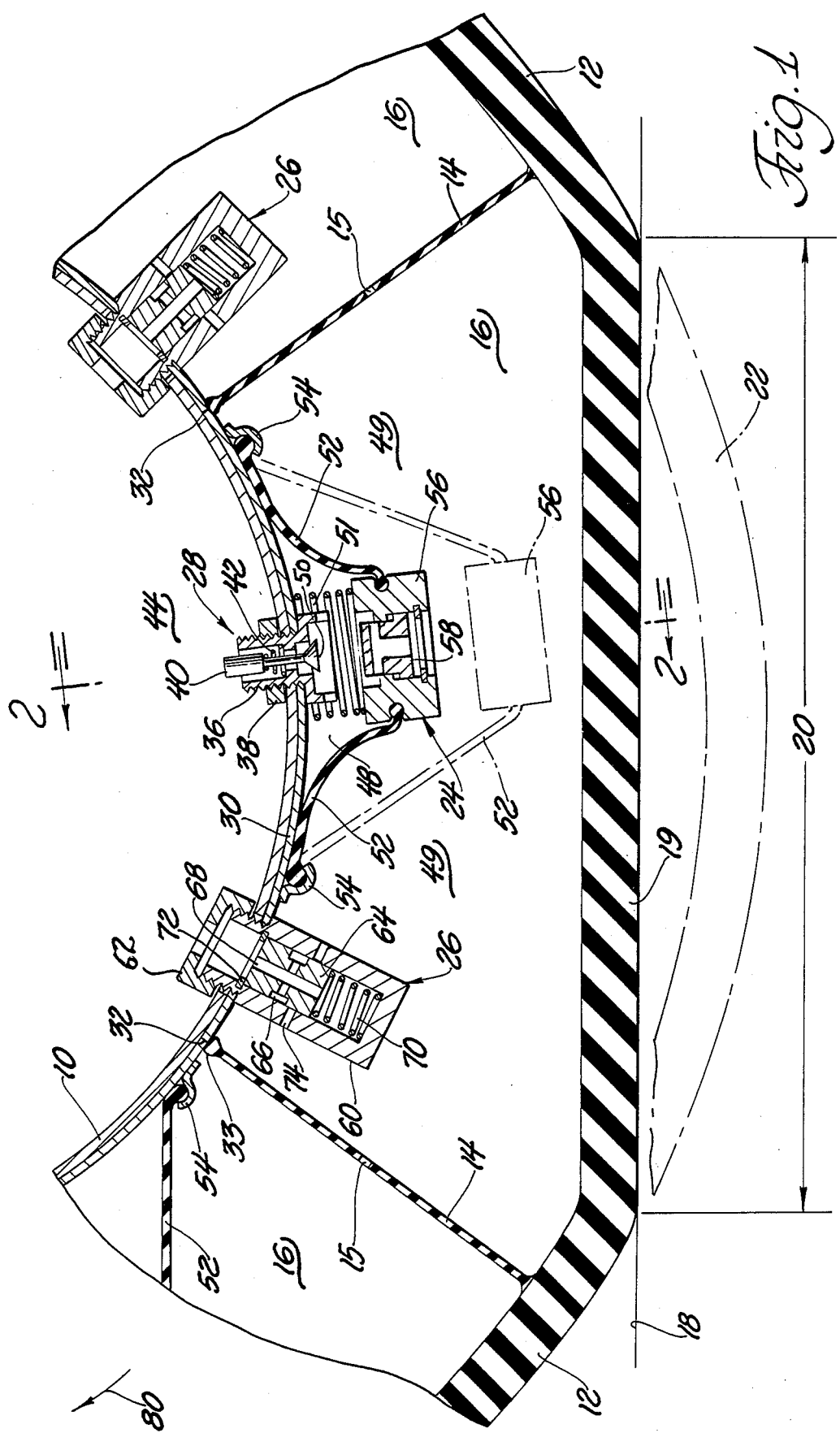
FIG. 1 is a fragmentary sectional view taken through a wheel-tire assembly incorporating the invention.
Figure 2:
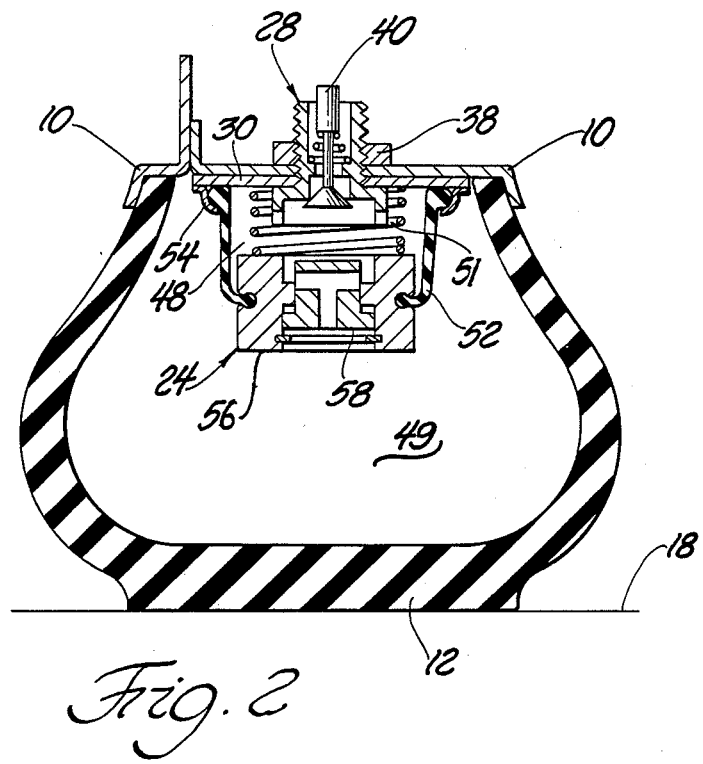
FIG. 2 is a sectional view on line 2—2 in FIG. 1.

Referring in greater detail to FIGS. 1 and 2, there is fragmentarily shown a wheel-tire assembly wherein the wheel comprises a rigid metal rim 10 of split construction. The tire is an elastomeric carcass reinforced with the usual cords or plys of steel, nylon, or rayon, etc.; bead areas of the tire are engaged with flanges on wheel rim 10, as per conventional practice. In the drawing the tread area of the tire is designated by numeral 12.

The tire is manufactured or fabricated to include a plurality of flexible radial partitions or walls 14 for subdividing the tire into a series of separate contiguous pressurizable compartments 16; these partition walls are made as stiff as possible, consistent with flexure requirements for the tire. The number of partitions 14 and compartments 16 may be varied. As shown, the tire has five partitions 14 and five compartments 16; FIG. 1 shows one of the compartments in its entirety and two adjacent compartments partially. The tire is engaged with terrain surface 18 such that the associated surface area 19 of tread 12 is flattened to provide a footprint having a length designated by numeral 20. Preferably the length of the footprint is inversely related to vehicle speed. At relatively low vehicle speeds, e.g. below fifteen miles per hour, the length of footprint 20 is relatively great, whereas at high vehicle speeds the length of footprint 20 is relatively small.

Phantom lines 22 indicate the contour that tread area 12 would take if it did not undergo the flattening action due to engagement with the terrain. The difference in contour between the non-flattened tire tread area 22 and the flattened tire tread area 19 represents the compressing or squeezing action exerted by the tire on the associated compartment 16 due to engagement of the tire with terrain 18. During each complete revolution of the wheel-tire assembly each of the five compartments 16 experiences a compressing or squeezing action similar to that depicted in FIG. 1.

Each compartment 16 has associated therewith three valve mechanisms designated by numerals 24, 26 and 28. These three valve mechanisms are directly or indirectly mounted on a segmental wall 30 formed of metal or other similar rigid material. As seen in FIG. 2, wall 30 is in the general plane of the tire bead area; however the showing is simplistic to illustrate valve element details. In an actual structure wall 30 would be located somewhat nearer the wheel rotational axis than the tire bead areas to provide a protected cavity for the valve mechanisms. In FIG. 1 the ends of segmental wall 30 are designated by numerals 32. Each segmental wall 30 has a length corresponding to the circumferential length of the associated compartment 16. Each segmental wall 30 seats against the outer surface of the associated wheel rim 10. The various segmental walls 30 are oriented such that ends 32 of the segmental walls are in sealing contact with inner edges 33 of radial partitions 14. Preferably each partition has a small opening 15 therein for enabling small quantities of pressurized air to flow from one compartment 16 to another compartment 16. The restricted air flow is sufficient to eliminate or minimize pressure imbalances as might cause one compartment 16 to perform differently than another compartment 16. However the air flow is so slight that for operational purposes each compartment may be visualized as being sealed or separated from adjacent compartments.

VALVE 28 CONSTRUCTION

Valve 28 includes a valve body 36 secured to segmental plate 30 by welding or other suitable means. A nut 38 is threaded onto body 36 to retain the valve 28-plate 30 assembly immovable relative to wheel rim 10. A special hole is drilled through the wheel rim to receive the threaded portion of valve body 36.

The space within valve body 36 is occupied by a valve element 40 and a light compression spring 42. During periods when the atmospheric pressure in zone 44 is greater than the pressure in chamber 48 the pressure differential will act on valve poppet portion 50 to open valve element 40, thereby enabling atmospheric air to flow from zone 44 into chamber 48. When the pressure in chamber 48 is at or above atmospheric pressure the valve element will close, thereby preventing reverse air flow out of chamber 48. Valve 28 constitutes an air intake valve for supplying atmospheric air to air admission chamber 48.

CHAMBER 48 CONSTRUCTION

Chamber 48 is defined by segmental plate 30 and a flexible elastomeric membrane 52. The peripheral edge of the membrane is suitably sealed to the face of plate 30, as by means of an annular retainer 54 welded or otherwise affixed to plate 30.

Chamber 48 constitutes an air admission chamber for a larger main chamber 49. Chamber 49 is the space within compartment 16 located outwardly from chamber 48. During certain operational periods, e.g. the intermediate vehicle speed range, valve 28 takes air into chamber 48, whereas valve 24 transfers air from chamber 48 into chamber 49. Valve 24 opens during the so-called "squeeze" period (when the associated tire section engages the ground to reduce the chamber 49 volume). Valve 28 opens during the so-called "expansion" period (when the associated tire section expands after leaving the ground).

FIG. 1 shows membrane 52 in two alternate positions, namely the full line position occurring during the squeeze period, and the dashed line position occurring during the expansion period.

VALVE 24 CONSTRUCTION

Valve 24 comprises a valve body 56 formed to define an internally stepped cylindrical guide surface for a differential area valve piston 58. The larger piston area is presented to chamber 49 and the smaller piston area is presented to chamber 48. Suitable ports and passages are formed in the piston, whereby the piston is enabled to control airflow from chamber 48 to chamber 49. Piston 58 is shown in a flowopen condition; when the piston is shifted radially outwardly in body 56 the valve ports (radial holes in the piston) are closed off, thereby preventing air flow from chamber 48 to chamber 49. Piston 58 is oriented so that piston motion is in a radial direction (relative to the wheel rotational axis), whereby high centrifugal forces throw the piston outwardly to a closed condition.

Valve 24 is responsive to centrifugal force and air pressure forces. Under low centrifugal force conditions (low vehicle speeds) the valve is assumed to be open, due to insufficient centrifugal force and approximately equal pressures in chambers 48 and 49. Under high centrifugal force conditions (high vehicle speeds) the valve is closed irrespective of the relative pressures in chambers 48 and 49; high centrifugal force throws piston 58 outwardly in housing 56. Under certain conditions valve 24 reacts to pressure differentials between chamber 48 and the main chamber 49; the valve is open when the numerical product of chamber 49 pressure and large piston area exceeds the numerical product of chamber 48 pressure and small piston area.

MEMBRANE 52 MOVEMENT

Membrane 52 is movable between its full line position lying close to or against segmental wall 30 and the dashed line position stretched outwardly from segmental wall 30. When membrane 52 is in its full line position the defined chamber 48 has a relatively small displaced volume, whereas when membrane 52 is in its dashed line position chamber 48 has a much larger volume.

Movement of membrane 52 from the dashed line position to the full line position occurs during the so-called squeezing cycle, i.e. when the associated compartment 16 is being compressed by engagement of the related tread area 12 with terrain 18. The pressure in chamber 49 momentarily rises, thereby producing a high pressure condition on the outer (larger) end surface of piston 58. The piston moves inwardly within valve body 56 to a flow-open condition. Air within chamber 48 is forced to flow outwardly through the ports in piston 58; simultaneously membrane 52 is deflected to the full-line position.

Movement of membrane 52 from the full line position to the dashed line position occurs during the so-called expansion cycle, i.e. immediately after the tire tread area associated with the related compartment 16 leaves terrain 18.

During the expansion cycle centrifugal force and spring 51 act in an additive manner on valve housing 56 to displace the housing and membrane 52 outwardly to the dashed line position; the outward motion is facilitated by the relatively low pressure existing in chamber 49 during the expansion cycle. Valve 24 (piston 58) is in a closed condition while membrane 52 is moving outwardly from the full line position to the dashed line position. Centrifugal force on piston 58 throws the piston outwardly to the closed condition even though the pressure in chamber 49 is for most of the time greater than the pressure in chamber 48. The piston face areas and piston mass must be sized in relation to pressure changes in order to achieve the desired result.

As membrane 52 moves outwardly toward the dashed line position the displaced volume of chamber 48 increases significantly, such that the chamber 48 pressure drops below atmospheric pressure. During the final stage of membrane 52 outward motion valve 28 opens to admit new air into chamber 48.

VALVE 26 CONSTRUCTION

Valve 26 functions as an exhaust valve for chamber 49. The valve is a centrifugally-actuated valve closed both at low vehicle speeds and at high vehicle speeds; the valve is open in a narrow vehicle speed range at or near the point at which valve 28 initially opens to admit new air into chamber 48.

Valve 26 includes a cylindrical valve body 60 suitably secured to segmental wall 30, as by means of welding. The inner threaded end of valve body 60 projects through a circular hole in wheel rim 10 to receive a nut 62. The nut clamps the valve 60-plate 30 assembly to the wheel rim. Slidably received within valve body 60 is a valve piston 64 having a circumferential groove 66 communicating with an internal passage structure 68. The piston is biased radially inward by a compression spring 70 to engage an internal stop 72 (at relatively low vehicle speeds, e.g. below fifteen miles per hour).

Valve body 60 has a number of ports 74 formed therein for selective communication with groove 66 when the vehicle is in a specific speed range, e.g. between fifteen and eighteen miles per hour. Piston 64 is oriented to move radially toward or away from the wheel rotational axis under the effect of centrifugal force. At low vehicle speeds the piston is engaged with stop 72. At higher speeds piston 64 is slung away from stop 72. In a narrow speed range (e.g. fifteen to eighteen miles per hour) piston 64 has its groove 66 in communication with ports 74 for enabling pressurized air in chamber 49 to be exhausted through valve passage 68 to atmosphere 44. At higher vehicle speeds groove 66 is disposed outwardly beyond ports 74, thereby precluding the exhaustion of air from chamber 49 to the atmosphere.

GENERAL OPERATION

As previously noted, each of the tire compartments 16 has a valve means associated therewith, i.e. an air intake valve 28 for air admission to chamber 48, a pressure-responsive valve 24 for transferring air from chamber 48 to chamber 49, and an exhaust valve 26 for exhausting air out of chamber 49. At very low vehicle speeds at least valves 26 and 28 will be closed; the pressure in each tire compartment 16 will be relatively low so that footprint 20 will be relatively long. At high vehicle speeds all three valves will be closed; the pressure in each tire compartment 16 will be relatively high such that tire footprint 20 will be relatively short. At high vehicle speeds the tire acts essentially like a conventional tire in the sense that there is no air flow to or from the tire interior space (compartments 16).

The action of the tire in the intermediate vehicle speed range is a squeezing action on the terrain-engaged tire compartments, followed by an expansion action thereon after the respective compartments leave the terrain surface. During the squeeze period atmospheric air may be transferred from chamber 48 to chamber 49. During the expansion period some new air may be drawn into chamber 48 through valve 28. Also, some air may be exhausted from chamber 49 to the atmosphere via valve 26. The process acts to transition the tire between the low speed "soft tire" condition to the high speed "hard tire" condition.

FIG. 3 GRAPH

Figure 3:
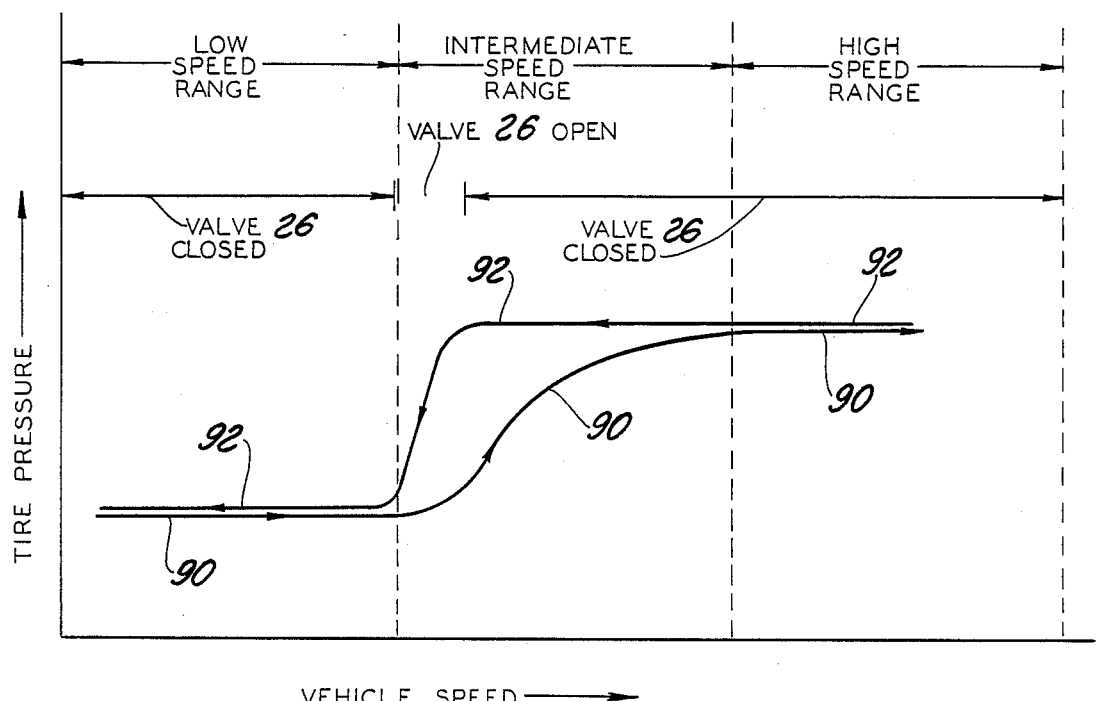
FIG. 3 is a chart illustrating the action of various valves in the FIG. 1 tire-wheel assembly.

FIG. 3 is a graph illustrating the action of various valves 24, 26 and 28 at different vehicle speeds. The speed is plotted on the X axis while air pressure is plotted on the Y axis. The plotted air pressure is the squeeze pressure in chamber 49 when the tire is engaged with the terrain. This is the pressure which determines the length (area) of the tire footprint. In the FIG. 3 graph curves 90 and 92 show the tire pressure to be relatively low in the low vehicle speed range and relatively high in the high speed range. Thus, the tire footprint is large in the low speed range and small in the high speed range. In the intermediate speed range the tire pressure varies from a low value at the lower end of the speed range to a higher value at the upper end of the speed range. The directional arrows on curves 90 and 92 indicate the direction of vehicle speed change. Numeral 90 references an acceleration condition, whereas numeral 92 references a deceleration condition.

LOW SPEED RANGE

In the low speed range exhaust valve 26 is closed (due to insufficient centrifugal force). The low average pressure in compartment 16 results in a relatively low squeeze pressure on membrane 52; valve piston 58 is presumably in an open condition so that chamber 48 is generally at the same pressure as chamber 49. Valve 28 is closed, such that the tire operates in a partially depressurized flattened condition. (The tire has a relatively large (long) footprint).

INTERMEDIATE SPEED RANGE

In the intermediate speed range the squeeze cycle produces a relatively large decrease in the displaced volume of chamber 48. During the expansion cycle membrane 52 is moved outwardly by centrifugal force and spring 51, to thereby create a vacuum condition in chamber 48. Valve 28 opens to admit new air into chamber 48.

The increased centrifugal force opens exhaust valve 26, such that admission of new air by valve 28 is partially balanced by exhaustion of so-called "old air" through valve 26, particularly when the vehicle is at the low end of the speed range. Assuming an acceleration condition (curve 90), after valve 26 closes any new air admitted through valve 28 produces a "tire pump up" condition; such a condition continues until the upper end of the intermediate speed range is reached.

When the upper end of the intermediate speed range is reached the tire pressure will be so high that the tire will undergo minimum (or zero) deflection during the so-called squeeze cycle. Membrane 52 will remain essentially in its dashed line position (FIG. 1) so that no new air will be drawn in during the expansion cycle.

During deceleration periods (curve 92) the pressure will be maintained at a high level until valve 26 starts to open (near the lower end of the intermediate speed range). At that time valve 26 will exhaust air out of chamber 49, producing a steep (abrupt) drop in pressure to the low value. Valve 26 is set to close at the demarcation point between the intermediate speed range and the low speed range. Valve 26 is necessary in order that the tire can be transitioned from the high pressure level to the low pressure level during (and after) vehicle deceleration into the low speed range.

HIGH SPEED RANGE

The pressure is at a maximum such that the tire experiences little or no deflection during the squeeze cycle. No new air is admitted to the tire, and no old air is exhausted from the tire. The valve system is designed to achieve a high tire pressure (small footprint) during high vehicle speed operations, and a low tire pressure (large footprint) during low vehicle speed operations. The aim is to have good soft terrain mobility at low speeds without sacrifice in tire performance at the higher speeds.

It should be noted that the design of the valves will dictate at what speeds the low, intermediate and high range will occur. It may be that different vehicle applications will require different threshold points for the valves to perform their specific functions. In one specific arrangement the demarcation between the low speed range and intermediate speed range is in the neighborhood of fifteen miles per hour, and the demarcation between the intermediate speed range and high speed range is in the vicinity of thirty miles per hour.

PRIOR ART

Various "centralized" tire pressure adjustment systems are already known. One example thereof is shown in U.S. Pat. No. 2,944,579.

It is also known to provide tires with pressurized interior chambers for preventing complete collapse of the tire in event of rupture of the tire casing. U.S. Pat. No. 2,554,815 shows one form that such a tire can take.

U.S. Pat. No. 2,690,779 shows an arrangement wherein a tire inner tube is partitioned to provide inner and outer chambers. When the tire (not shown in the patent drawings) hits a bump air flows rapidly from the outer chamber into the inner chamber, thereby softening the blow and maintaining a reasonably smooth ride. After passage over the bump air slowly returns from the inner chamber to the outer chamber.

U.S. Pat. 3,236,278 shows a wheel-tire assembly wherein the wheel defines an auxiliary air chamber having valved communications with the tire chamber. Various different types of valves are described, e.g. pressure-responsive valves, centrifugal (speed) responsive valves, and acceleration-responsive valves. The inventor indicates that the tire can become stiffer at high speeds and softer during start-up or while braking (decelerating). There is some doubt that the patented system can achieve a low tire pressure condition (or high pressure condition) for more than a few seconds at a time. The patented system appears to have only instantaneous effects; over a period of time the pressures in the auxiliary chamber and tire chamber will equalize so that tire action will be largely controlled by initial inflation pressure. My system is believed to be different than the known patented systems.

FIG. 4 EMBODIMENT

FIG. 4 fragmentarily illustrates an embodiment of my invention wherein valves 28 and 24 are incorporated into a unitary sub-assembly. Valve 24 comprises a stepped piston 58a having a large effective area presented to chamber 49 and a small effective area presented to chamber 48. Chamber 48 is formed by a rigid housing structure 52a in lieu of flexible membrane 52 (FIG. 1). Flow of air from chamber 48 to chamber 49 is through a central passage 55 having a spring-urged check valve (ball) 53 therein for preventing air flow under certain conditions.

In the low speed range the piston face area differential is a predominate force. Thus, piston 58a will be displaced inwardly such that chamber 48 has a relatively small volume, even during the expansion cycle.

In the intermediate speed range centrifugal force is a major factor. During the squeeze cycle the high pressure in chamber 49 acts on the large face area of piston 58a such that the piston is moved inwardly from its illustrated position; air flows from chamber 48 through passage 55 into chamber 49. During the expansion cycle spring 51 and centrifugal force cooperatively move piston 58a outwardly to its illustrated position; the rapid increase in chamber 48 volume produces a sub-atmospheric condition in chamber 48, which allows valve 28 to open for admitting new air into chamber 48. Check valve 53 maintains the vacuum condition in chamber 48 while piston 58a is moving outwardly.

In the high speed range the tire assumes a relatively hard condition. Chamber 49 pressure undergoes minimal variation during the squeeze cycle and expansion cycle. Centrifugal force keeps piston 58a in its outwardly displaced position. No new air is admitted to chamber 48.

FIG. 5 VALVE

FIG. 5 illustrates a lock-out device usable with valve 26 to prevent exhaustion of air from chamber 49. Structurally the lock-out device comprises a cylindrical block 75 having a central threaded opening for receiving a threaded screw member 76; a pressure disk 77 is carried on the inner end of member 76.

When thumb wheel 78 is turned screw 76 can be advanced downwardly to move valve piston 64 to a position wherein groove 66 is out of registry with ports 74, thus interrupting the potential airflow path through valve 26. One or more vent holes 79 can be provided in block 75 to preclude a vacuum condition within valve body 60.

This add-on lock-out device would be used when (where) soft soil (soft tire) operation was not needed, either at particular times of the year or under different geographical conditions.

FIG. 6 VALVE

FIG. 6 shows a valve 26a that can be used in lieu of valve 26 shown in FIG. 1. The FIG. 6 valve comprises a housing 60a suitably secured to segmental wall 30, as by welding. Spherical valve element 80 is urged by spring 82 to a closed position against seat 84. In the closed position there is no air flow from chamber 49 to ambient atmosphere 44.

In the low speed range spring 82 (with the help of centrifugal force) keeps valve element 80 closed against the force of chamber 49 pressure. At the onset of the intermediate speed range the squeeze pressure in chamber 49 is sufficient to open valve element 80. At higher speeds centrifugal force maintains element 80 in a closed condition.

TIRE FILLING PROCEDURE

It is necessary to initially pressurize the various tire compartments prior to putting the tire into service. A conventional filler valve, not shown, could be provided with an air gallery to distribute the air to each chamber equally. The filler valve was not shown on the drawings in order that the new valve mechanisms 24, 26 and 28 could be shown in sufficient detail to make the valve operations easily understood.

I wish it to be understood that I do not desire to be limited to the exact details of construction shown and described for obvious modifications will occur to a person skilled in the art, without departing from the spirit and scope of the appended claims.

I claim:

1. In a wheel-pneumatic tire assembly intended for operation on soft or hard terrain in a range of vehicle speeds: the improvement comprising mechanism causing the tire to have a relatively large area footprint in a low vehicle speed range, and a relatively small area footprint in a high vehicle speed range;

said mechainsm comprising partition means (14) subdividing the tire into a series of separate pressurizable compartments occupying different contiguous locations around the tire circumference; wall means (52, 52a) arranged in each compartment for dividing same into a relatively large main chamber and a relatively small air-admission chamber (48);

a first air intake check valve between the atmosphere and each air admission chamber for admitting air into the admission chamber when the admission chamber pressure is below atmospheric pressure;

a second valve between each air admission chamber and each main chamber, each said second valve being responsive to centrifugal force and tire-terrain squeeze pressure for transferring air from the associated air-admission chamber to the associated main chamber when the vehicle is in a transition speed range between the low and high speed ranges;

and a third exhaust valve between each main chamber and atmosphere, each said third valve being responsive to centrifugal force for exhausting pressurized air out of the main chamber to the atmosphere only when the vehicle is at a specific speed range within the transition speed range.

2. The improvement of claim 1: each said second valve comprising a differential area piston having a relatively large effective area presented to the associated main chamber and a relatively small effective area presented to the air admission chamber.

3. The improvement of claim 2: each differential area piston having its movement axis oriented on a radial line measured from the wheel rotation axis.

4. The improvement of claim 3 wherein the interface between each air admission chamber and associated tire compartment comprises a flexible membrane (52) movable between a first condition wherein the air admission chamber has a relatively small displaced volume and a second condition wherein the air admission chamber has a relatively large displaced volume; each said membrane being responsive to tire expansion to move outwardly from the first condition to the second condition; each said membrane being responsive to tire-terrain squeeze action to move inwardly from the second condition to the first condition.

5. The improvement of claim 4 wherein each air intake valve is operable to admit atmospheric air into the air admission chamber while the flexible membrane is undergoing outward motion to enlarge the volume of said air admission chamber, each air intake valve automatically closing to prevent backflow from the air admission chamber to the atmosphere.

6. The improvement of claim 1 wherein the partition means comprises a number of radial partitions spaced equi-distantly around the tire circumference.

* * * * *